United States Patent Office.

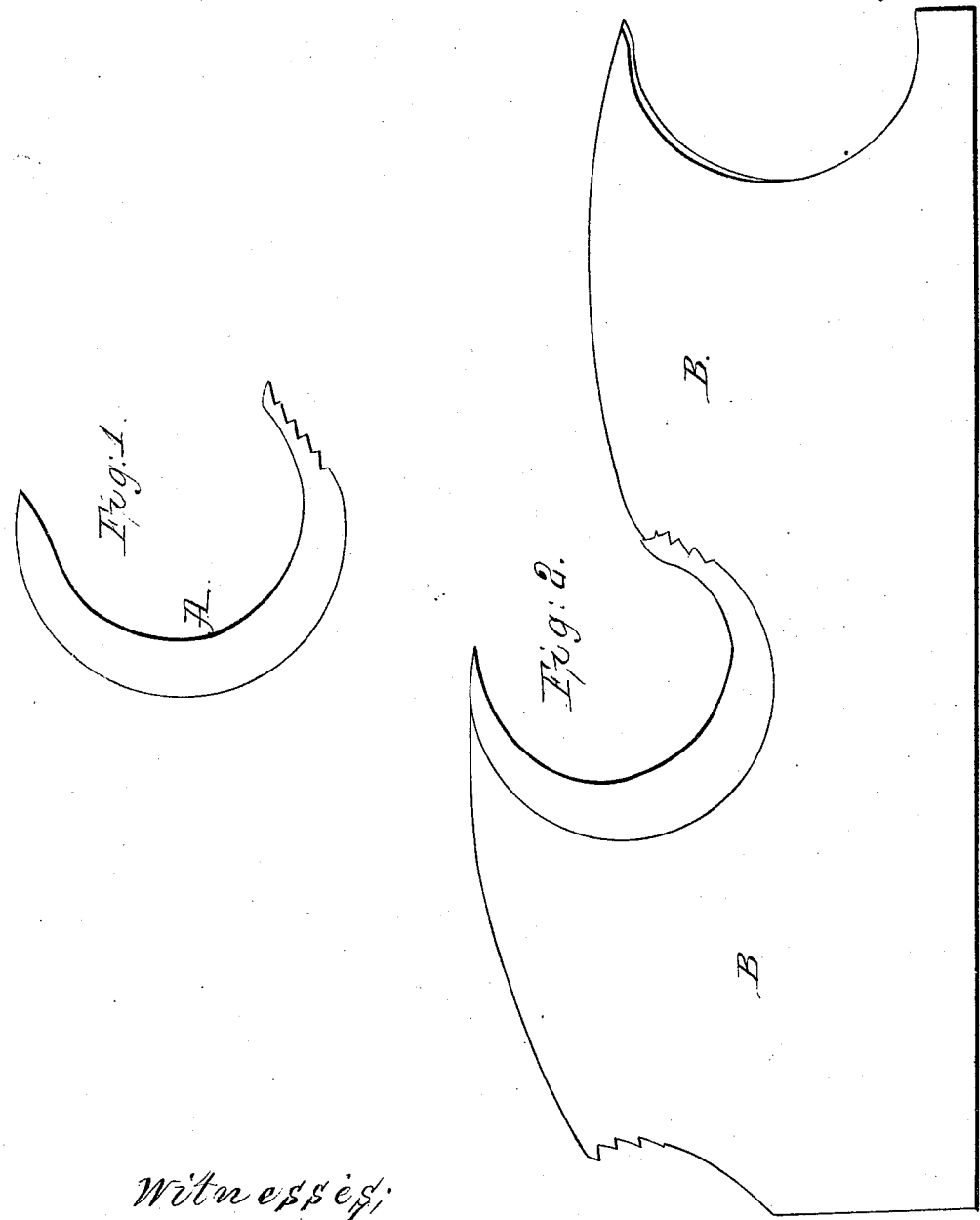

JAMES E. ATWOOD, OF TRENTON, NEW JERSEY, ASSIGNOR TO HIMSELF AND CYRUS H. McCORMICK, OF NEW YORK CITY.

*Letters Patent No. 70,680, dated November 12, 1867.*

IMPROVEMENT IN SAWS.

*The Schedule referred to in these Letters Patent and making part of the same.*

TO ALL WHOM IT MAY CONCERN:

Be it known that I, JAMES E. ATWOOD, of Trenton, in the county of Mercer, in the State of New Jersey, have invented a new and useful Mode of Preventing Saw-Teeth from Turning Back; and I do hereby declare that the following is a full and exact description thereof, reference being had to the accompanying drawings, and to the letters of reference marked thereon.

The nature of my invention consists in inserting a movable saw-tooth in such a manner as to have but very little strain upon the plate, and held in its place by means of a ratchet.

Figure 1 is a view of the tooth with ratchet attached.

Figure 2 is a perspective view.

Letter A is a quarter-moon-shaped tooth; letters $c\ c\ c$ is the ratchet. Letter A, in fig. 2, is the tooth when inserted; letters $c\ c\ c$ are the ratchet, notches, or cogs; letters B B are the saw-plate. I construct tooth A in a quarter-moon shape, of the best cast steel, as shown by fig. 1. Ratchet $c\ c\ c$ is made by filing, or may be done by swaging. The cavity or insertion is cut into plate B, so that the opening is at an angle of about forty-five degrees. The ratchet or notches in plate B are filed in at the lower side of the insertion at $c\ c\ c$. The use or advantage of said ratchet is to prevent the tooth from turning when it strikes a knot; also when the point of the tooth is worn short I turn the tooth out one notch of the ratchet $c\ c\ c$ until the tooth is worn out.

The advantage of my invention is as follows: first, it has more room for the saw-dust; second, it is held in the plate without straining the same; third, its position is such that the cutting point cuts and does not scrape, as when the insertion is open at the top.

I do not claim circular lines or round insertions, but what I do claim as my improvement, and desire to secure by Letters Patent, is—

The tooth A, when held in its position by ratchet $c\ c\ c$, for the purpose herein described.

JAMES E. ATWOOD.

Witnesses:
   JAMES ROGES,
   W. R. SCHOOLEY.